United States Patent [19]
Froud

[11] Patent Number: 5,286,387
[45] Date of Patent: Feb. 15, 1994

[54] EFFLUENT FILTRATION AND SACK FILTER APPARATUS

[75] Inventor: David Froud, Maidstone, United Kingdom

[73] Assignee: Copa Research Limited, Kent, United Kingdom

[21] Appl. No.: 50,189

[22] PCT Filed: Nov. 4, 1991

[86] PCT No.: PCT/GB91/01926
§ 371 Date: May 5, 1993
§ 102(e) Date: May 5, 1993

[87] PCT Pub. No.: WO92/07645
PCT Pub. Date: May 14, 1992

[30] Foreign Application Priority Data

Nov. 5, 1990 [GB] United Kingdom ............ 9023988.0
Apr. 30, 1991 [GB] United Kingdom ............ 9109282.5

[51] Int. Cl.⁵ .................... B01D 61/00; B01D 24/46; B01D 24/30
[52] U.S. Cl. ................... 210/649; 210/791; 210/388; 210/241; 210/107; 210/448; 210/485

[58] Field of Search ........... 210/649, 791, 388, 241, 210/253, 195.1, 107, 448, 485

[56] References Cited

U.S. PATENT DOCUMENTS

| | | | |
|---|---|---|---|
| 2,070,201 | 9/1937 | Geary | 210/748 |
| 2,482,302 | 9/1949 | Summers et al. | 210/190 |
| 4,842,751 | 6/1989 | Dunkers | 210/798 |
| 4,970,004 | 11/1990 | Rosaen | 210/388 |
| 5,053,141 | 10/1991 | Laiho | 210/388 |
| 5,158,672 | 10/1992 | Lagrech | 210/388 |

Primary Examiner—Robert A. Dawson
Assistant Examiner—Ana M. Fortuna
Attorney, Agent, or Firm—Lowe, Price, LeBlanc & Becker

[57] ABSTRACT

Apparatus for filtering liquid effluent comprises, in sequence, inlet means, filtration means, and outlet means. Each filtration means comprises at least one disposable sack filter (2, 3, 4, 31) of defined porosity. The open end of each sack filter is attached to an outlet conduit in communication with the inlet means. The opposing closed ends of the sack filters are attached to movable supports to cause agitation of the sack filters.

9 Claims, 6 Drawing Sheets

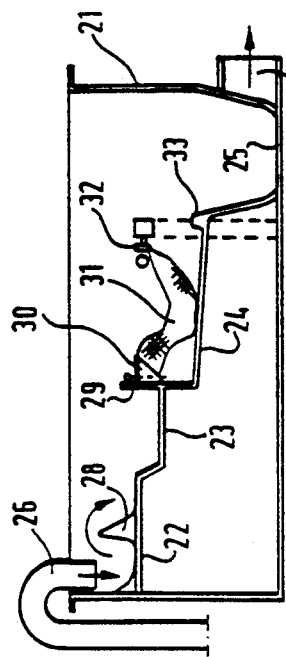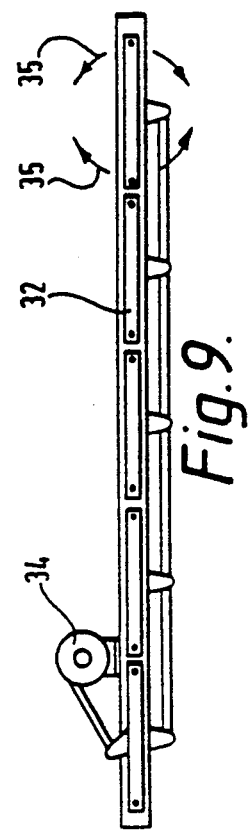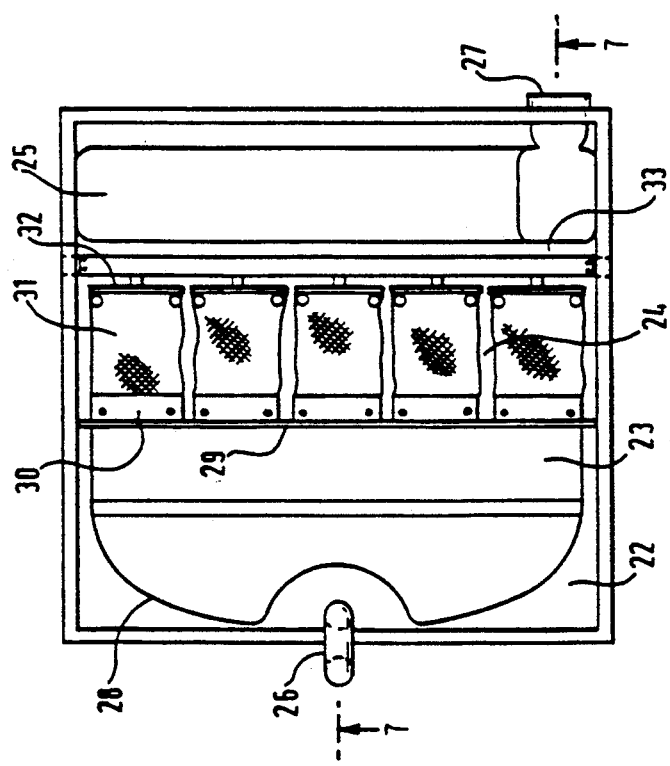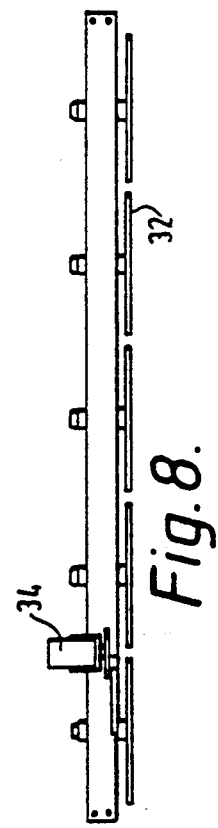

EFFLUENT FILTRATION AND SACK FILTER APPARATUS

This invention relates to effluent filtration, and more particularly to a method and apparatus for filtering liquid effluent.

A problem with treating liquid effluent, particularly from the domestic sector, is to prevent visible pollutants, such as rags, rubber materials, plastics etc, from being discharged with the liquid effluent via sea outfalls and causing visible pollution of the sea and bathing beaches. This problem has not been solved by straightforward filtration, because of difficulties caused by "blinding" of the filters, i.e. blockage of the pores in the filters caused by the solid materials. The problem is a wide one, and is not restricted to sea outfalls or to domestic effluent.

The present invention has surprisingly solved this problem by making use of disposable sack filters in combination with agitation means and/or disposable sack filters of decreasing porosity in a cascade formation. The agitation means or drop from level to level minimise blinding of the sack filters.

In one aspect, the invention provides a method of filtering liquid effluent, comprising causing said effluent to pass through filtration means comprising at least one disposable sack filter, the open end of the sack filter being attached to an outflow conduit, and the opposing closed end of the sack filter being attached to a moving support thereby to cause agitation of the sack filter.

In another aspect, the invention provides a method of filtering liquid effluent, comprising causing said effluent to pass through a plurality of filtration means arranged at successively lower levels, wherein each filtration means comprises at least one disposable sack filter of defined porosity, the respective porosities of the sack filters decreasing successively from the first filtration means to the last filtration means.

The above aspects of the method of the invention may be employed separately or in combination with each other.

The invention also provides apparatus for filtering liquid effluents, comprising, in sequence, inlet means, filtration means, and outlet means, and wherein the filtration means comprise at least one disposable sack filter, the open end of the sack filter being attached to an outflow conduit in communication with the inlet means, and the opposing closed end of the sack filter being attached to a movable support thereby to cause agitation of the sack filter when in use.

The invention further provides apparatus for filtering liquid effluent, comprising, in sequence, inlet means, a plurality of filtration means arranged at successively lower levels, and outlet means, whereby in use effluent is caused to pass successively through each of the filtration means, and wherein each filtration means comprises at least one disposable sack filter of defined porosity, the respective porosities of the sack filters decreasing successively from the first filtration means to the last filtration means.

The above variations on the apparatus of the invention may be employed separately or in combination with each other.

The closed end of the sack filter is preferably supported at about the same horizontal level as the open end. The moving support preferably causes the closed end of the sack filter to rotate and/or reciprocate relative to the open end. The sack filter is preferably accommodated in a filtration chamber having an overflow dam so as to maintain a level of liquid in the chamber, the lowermost side of the sack filter being covered by the liquid. Such a filtration chamber may constitute one of a series of successively lower levels through which the effluent is caused to pass. Filtration means may also be provided at at least one other level.

Preferably, additional means are provided for lengthening the time interval taken for the sack filters to blind. For example, at least some of the sack filters may be agitated by means of a shaking system provided by a cam or other off-centre device. Alternatively, a water jet system may be used to spray some or all of the sack filters either constantly or at irregular or predetermined intervals.

In one embodiment, the sack filters of at least one filtration means are arranged in a self-draining chamber which floods at periods of high flow and then drains. The liquid filling the chamber provides buoyancy for the sack filters, which consequently rise and fall with the changing liquid levels. The resulting movement increases the time taken for the sack filters to blind.

BRIEF DESCRIPTION OF DRAWING

Reference is now made to the accompanying drawings, in which.

Figure 4A:
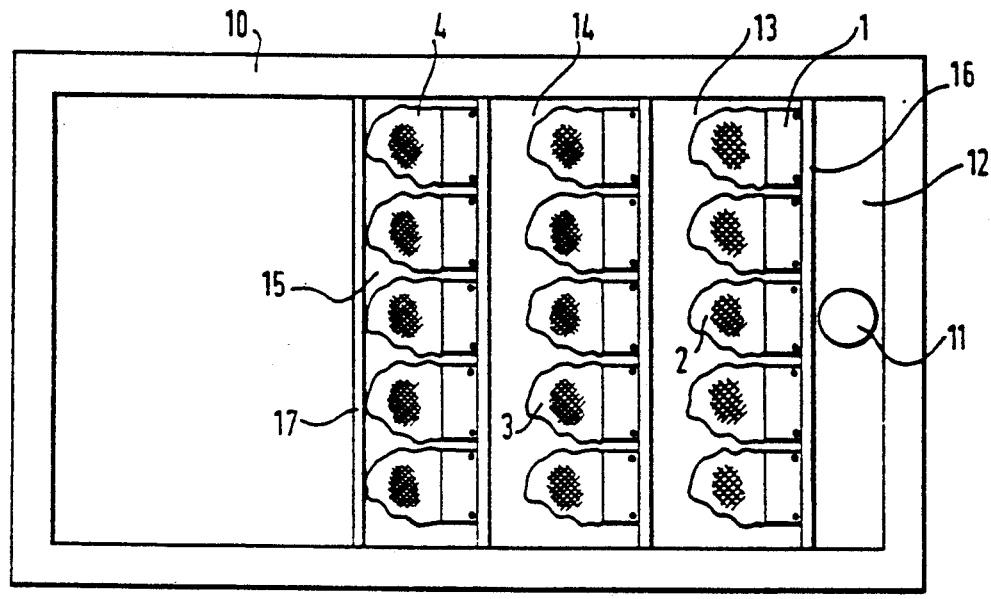
FIGS. 4A and 4B are views corresponding to FIG. 1 of an embodiment including a self-draining chamber.
Figure 4B:
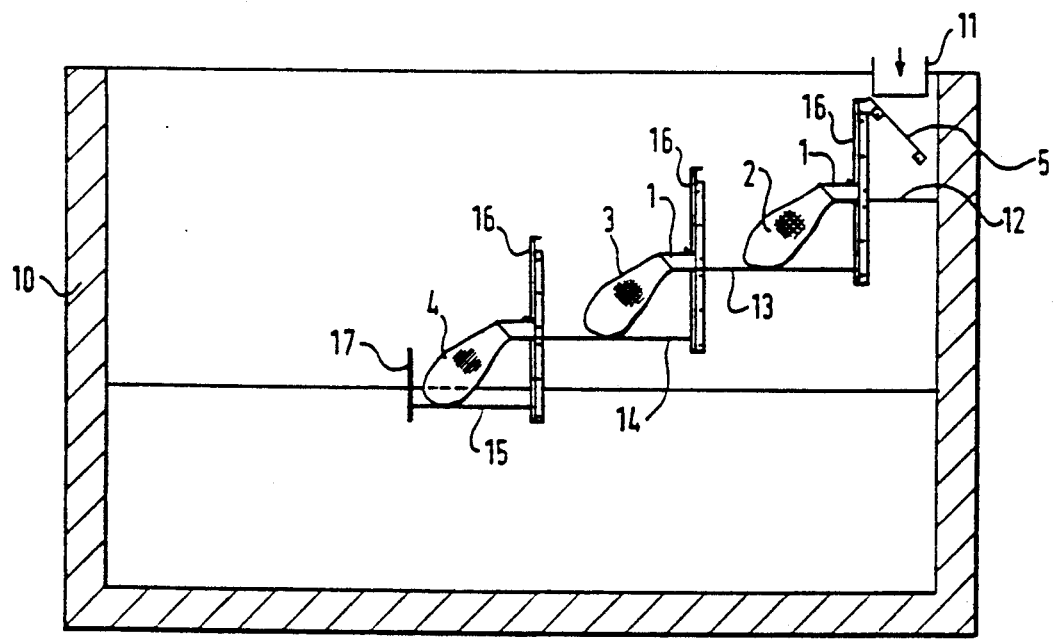

FIGS. A-C illustrate the operation of the self-draining chamber shown in FIG. 4;

FIG. 6 is a plan view of another embodiment of the invention;

FIG. 7 is a section on the line X—X of FIG. 6;

FIG. 8 is a plan view of an agitator for use in the embodiment of FIG. 6; and

FIG. 9 is a side view corresponding to FIG. 8.

DETAILED DESCRIPTION OF DRAWINGS

Figure 1A:
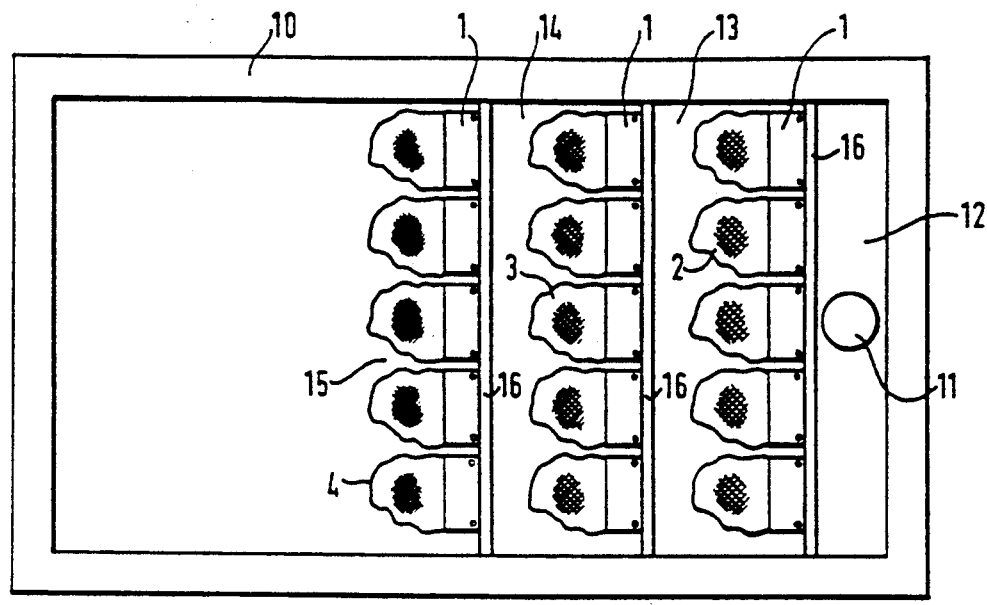
FIG. 1A is a plan view and FIG. 1B a side view of a filter cascade according to one embodiment of the invention.
Figure 1B:
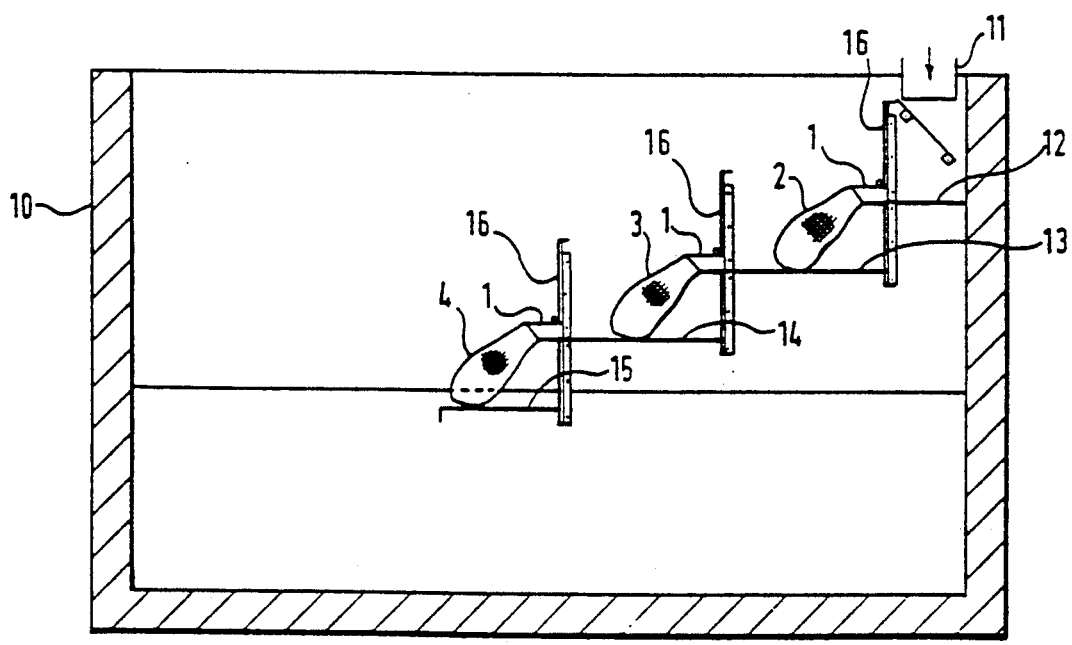

FIG. 1 shows a filtration tank 10 having an inlet 11 at the top for liquid effluent. The effluent may be pumped or fed by gravity. An outlet (not shown) is provided at the bottom of the tank. A cascade consisting of three levels of filtration means is arranged inside the tank. Effluent enters the cascade by passing over a deflector plate 5 (FIG. 2B). There is provided an inlet chamber 12, a first filtration chamber 13, a second filtration chamber 14 and an outlet station 15. As shown in FIG. 1B, the bottoms of components 12, 13, 14 and 15 are at successively lower levels. Each of the chambers 12, 13 and 14 is separated from the successive portion by a vertical separation plate 16. An outflow conduit 1 (referred to as a nose box) is arranged at the bottom of each of the plates 16. The nose box has an overhanging upper end and is the point of attachment for sack filters 2, 3 and 4. In the embodiment shown, there are five nose boxes at each level with a corresponding number of sack filters.

The sack filters are detachably attached to the nose boxes by pins which pass through the sack filters and engage in holes in the nose boxes.

The group of five sack filters 2 attached to the nose boxes adjoining the inlet chamber 12 constitute a first filtration means. These sack filters have relatively coarse perforations, e.g. 10 to 12 mm.

The group of five sack filters 3 attached to the nose boxes adjoining the first filtration chamber 13 constitute a second filtration means, i.e. for filtering effluent which has already passed through the first filtration means. The sack filters 3 are of medium porosity, e.g. with 4 to 6 mm perforations.

The group of five sack filters 4 attached to the nose boxes adjoining the second filtration chamber 14 constitute a third filtration means, i.e. for filtering effluent which has already passed through the second filtration means. These sack filters are of fine porosity, e.g. with 2 to 3 mm perforations. Effluent which has passed through the third filtration means exits via the outlet at the bottom of the tank 10.

The sack filters are typically made of polypropylene. However, other synthetic or natural materials can be used. The sack filters are readily detachable from the nose boxes, and need to be changed from time-to-time, e.g. from a few days to several weeks, depending on the rate of flow and degree of contamination of the effluent.

Figure 2A:
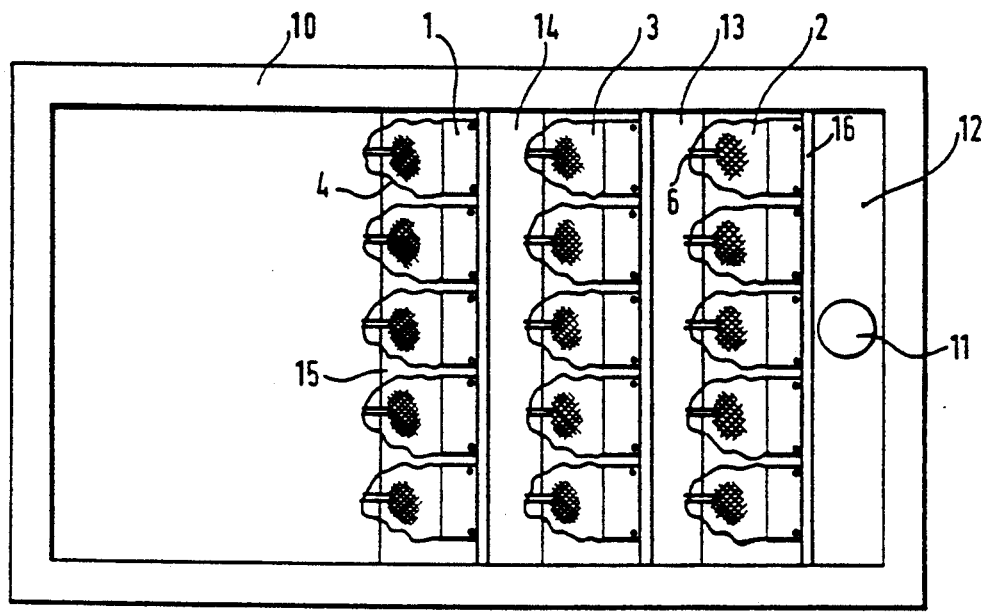
FIGS. 2A and 2B are views corresponding to FIG. 1 of an embodiment including a shaking system to agitate the sack filters.
Figure 2B:
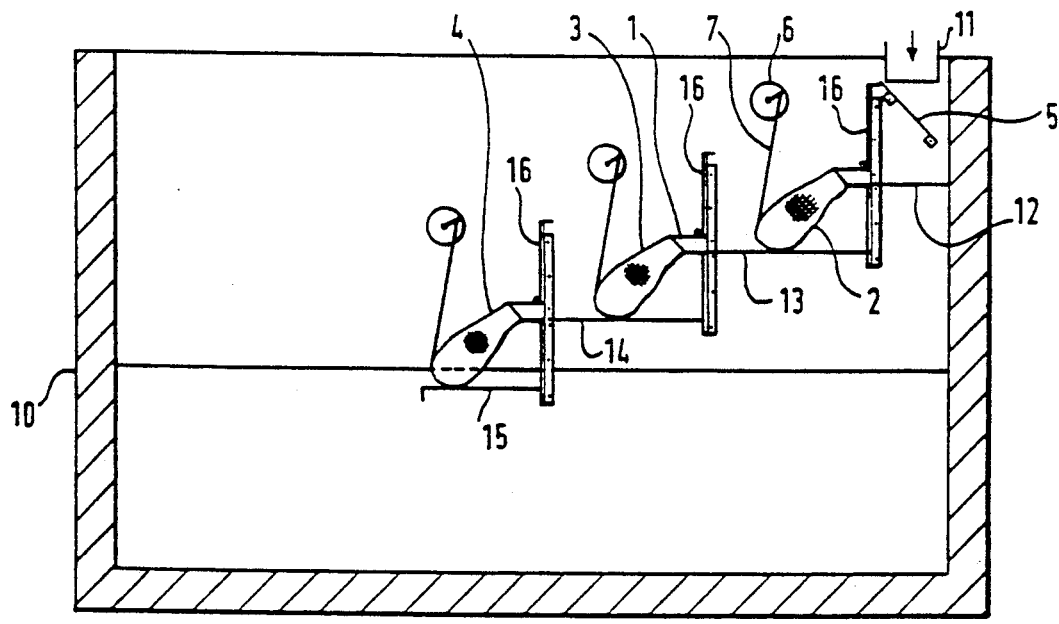

In FIGS. 2 to 5, the parts common to FIG. 1 are shown by the same reference numerals. FIG. 2 includes in addition a oscillating device for agitation of the sack filters, to prevent premature blinding. The oscillating device comprises rotating wheels 6 each attached by a linkage 7 to respective sack filters. As the wheels rotate, the sack filters are thus caused to rise and fall.

Figure 3A:
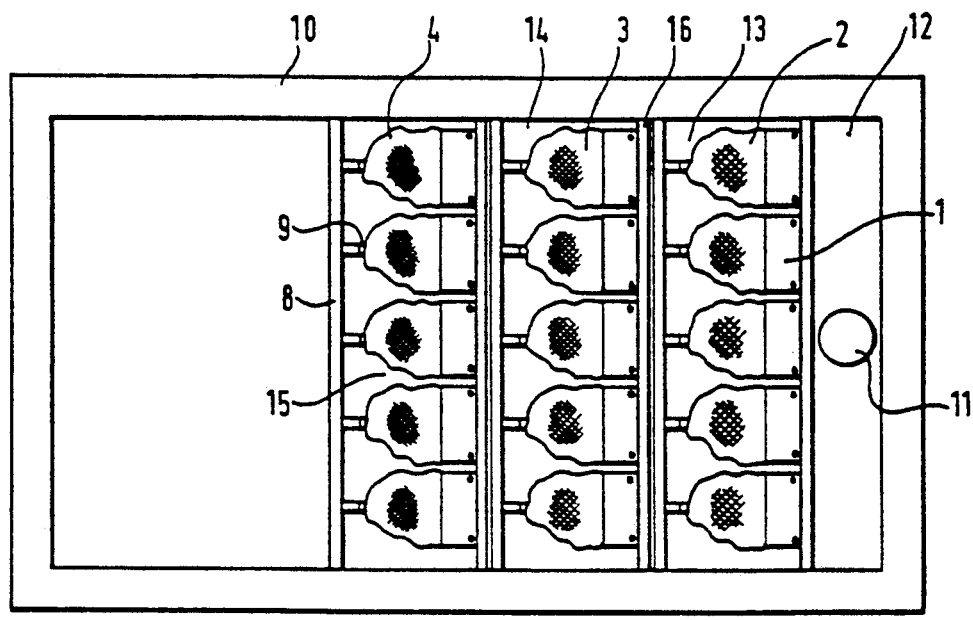
FIGS. 3A and 3B are views corresponding to FIG. 1 of an embodiment including a water jet system to spray the sack filters.
Figure 3B:
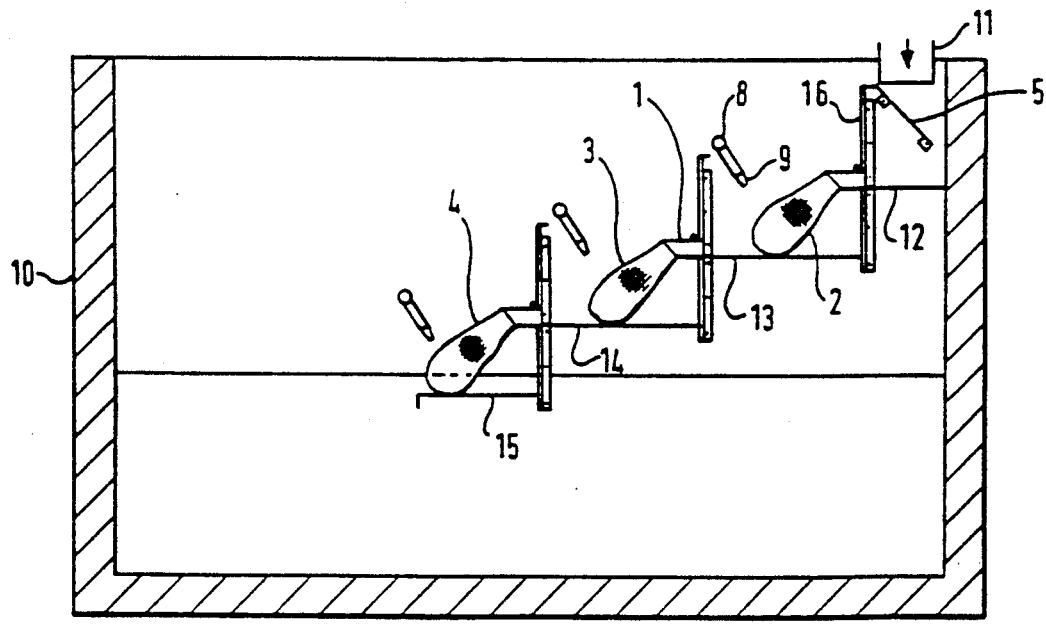

In FIG. 3, a water jet system is provided to spray the sack filters either constantly or at irregular or predetermined intervals. Water pressure feed pipes 8 are provided, with a spray nozzle tip 9 directed to each of the sack filters.

Figure 5A:
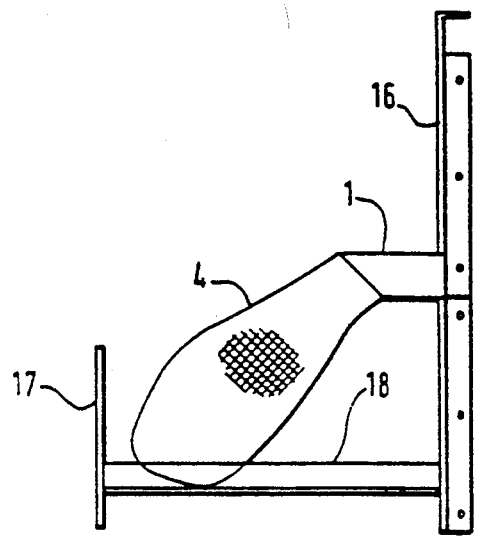
Figure 5B:
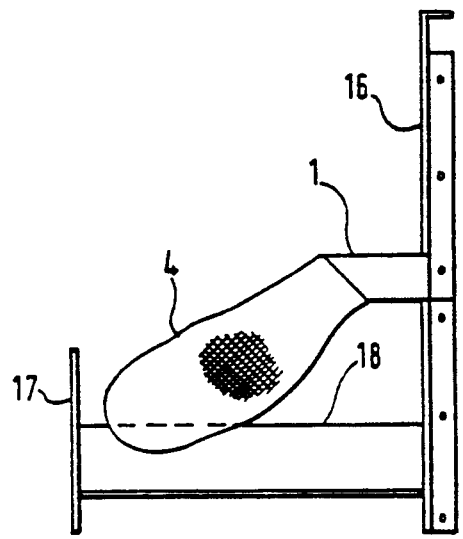
Figure 5C:
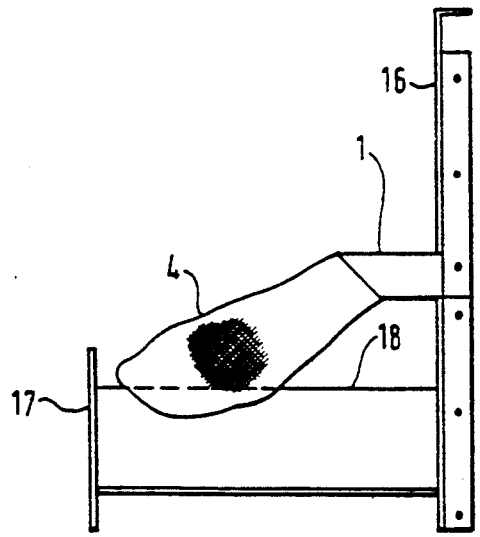

In the embodiment shown in FIGS. 4 and 5, the outlet station 15 is delimited by an adjustable discharge control plate 17. The latter can be adjustable in height and has adjustable drainage ports. With high effluent flow, a self-draining chamber is thus formed. The level 18 of effluent in this chamber will vary, as shown at A, B and C in FIG. 5. The buoyancy of the sack filters 4 causes them to rise and fall with the changing level 18. The resulting movement increases the time taken for the sack filters to blind. The rate of rise and fall of the level 18 can be varied by adjusting the discharge control plate 17.

In the embodiment shown in FIGS. 6 to 9, a filtration tank 21 incorporates a cascade of successively lower levels 22, 23, 24 and 25. An inlet conduit 26 feeds liquid effluent into the highest level 22. An outlet conduit 27 releases filtered effluent. A curved dam 28 is provided in the highest level 22, the liquid effluent overflowing the dam 28 before passing to lower levels.

A vertical separation plate 29 is placed between levels 23 and 24, and includes along its length five nose boxes 30. Sack filters 31 are attached respectively to the nose boxes 30. The level 24 thus constitutes a filtration chamber in the cascade. Each of the filter sacks 31 is supported at the two corners of its closed end by a respective agitation arm 32 of the agitator shown in more detail in FIGS. 8 and 9. The closed end of the sack is supported at about the same horizontal level as the open end, with the middle portion of the sack sagging towards the floor of the level 24. The outlet side of the level 24 is delimited by a shallow dam 33 which the effluent flows over. A shallow level of liquid is thus maintained in the filtration chamber, and the lowermost side of the sack filters are thus covered by liquid.

The agitator includes a hydraulic crank drive 34 linked to an endmost agitation arm 32, which is in turn linked to the other agitation arms, so that the agitation arms are caused to partly rotate in reciprocal fashion as shown by the arrows 35, i.e. as one end of an agitation arm swings up, the other end swings down, and then vice versa. This causes corresponding up and down movement of the closed ends of the filter sacks 31. The agitator typically operates at a speed of 30 cycles per minute with an amplitude of 60° from the horizontal.

The filter sacks 31 can be attached to the nose boxes 30 by pins as described in relation to FIG. 1. However, it is preferred to attach the filter sacks to the nose boxes by close-fitting rectangular yokes or collars which fit around the outside of the necks of the sacks on the nose boxes. The yokes are in turn fixed to the nose boxes by pins which pass through corresponding engagement holes. The close fitting yokes help to prevent leakage of effluent around the outside of the nose boxes.

One particular advantage of agitating the filter sacks as described above is that a rolling action is generated in the sacks. As a result, once the solid retention in the sack reaches a critical mass, large faecal matter is broken down so that typically all particles discharged are less than 3 mm diameter. These relatively small particles can be biologically degraded much more rapidly than large faecal matter currently discharged in conventional installations, and thus produces a substantial improvement in water quality.

I claim:

1. A method of filtering liquid effluent, comprising causing said effluent to pass through filtration means comprising at least one disposable sack filter, the open end of the sack filter being attached to an outflow conduit, wherein the opposing closed end of the sack filter is attached to a moving support at about the same horizontal level as the open end, and the moving support causes the closed end of the sack filter to rotate and/or reciprocate relative to the open end, thereby to cause agitation of the sack filter.

2. A method according to claim 1, wherein the sack filter is accommodated in a filtration chamber having an overflow dam so as to maintain a level of liquid in the chamber, the lowermost side of the sack filter being covered by the liquid.

3. A method according to claim 2, wherein the filtration chamber constitutes one of a series of successively lower levels through which the effluent is caused to pass.

4. A method according to claim 2, wherein filtration means are also provided at at least one other level.

5. A method according to claim 4, wherein each filtration means comprises at least one disposable sack filter of defined porosity, the respective porosities of the sack filters decreasing successively from the first filtration means to the last filtration means in the direction of flow of the effluent.

6. A method according to claim 5, wherein at least some of the sack filters are sprayed with a water jet to prevent premature blinding.

7. A method according to claim 6, wherein the sack filters of at least one filtration means are arranged in a self-draining chamber which floods at periods of high flow and then drains, the sack filters rising and falling with the change in liquid levels, whereby the resulting movement increases the time taken for the sack filters to blind.

8. A method according to claim 5, wherein the sack filters of at least one filtration means are arranged in a self-draining chamber which floods at periods of high flow and then drains, the sack filters rising and falling with the change in liquid levels, whereby the resulting movement increases the time taken for the sack filters to blind.

9. Apparatus for filtering liquid effluents, comprising, in sequence, inlet means, filtration means, and outlet means, and wherein the filtration means comprise at least one disposable sack filter, the open end of the sack filter being attached to an outflow conduit in communication with the inlet means, and the opposing closed end of the sack filter is attached to a movable support at about the same horizontal level as the open end, and the movable support is adapted to cause the closed end of the sack filter to rotate and/or reciprocate relative to the open end, thereby to cause agitation of the sack filter when in use.

* * * * *